United States Patent
Tran et al.

(10) Patent No.: US 10,462,036 B2
(45) Date of Patent: Oct. 29, 2019

(54) LINE RATE ETHERNET TRAFFIC TESTING

(71) Applicant: Google Inc., Mountain View, CA (US)

(72) Inventors: Brian Tran, San Jose, CA (US); Ke Dong, San Jose, CA (US); Xinfa Wu, Pleasanton, CA (US); Huy Nguyen, Mountain View, CA (US); Sean Howarth, Los Altos, CA (US)

(73) Assignee: Google LLC, Mountain View, CA (US)

( * ) Notice: Subject to any disclaimer, the term of this patent is extended or adjusted under 35 U.S.C. 154(b) by 154 days.

(21) Appl. No.: 15/679,512

(22) Filed: Aug. 17, 2017

(65) Prior Publication Data

US 2018/0062973 A1    Mar. 1, 2018

Related U.S. Application Data

(60) Provisional application No. 62/379,219, filed on Aug. 24, 2016.

(51) Int. Cl.
*H04L 12/26* (2006.01)

(52) U.S. Cl.
CPC ............ *H04L 43/50* (2013.01); *H04L 43/065* (2013.01); *H04L 43/0835* (2013.01); *H04L 43/0847* (2013.01); *H04L 43/16* (2013.01)

(58) Field of Classification Search
CPC .............. H04L 43/065; H04L 43/0835; H04L 43/0847; H04L 43/16; H04L 41/5051; H04L 41/5061; H04L 41/509; H04L 43/00; H04L 43/08; H04L 43/0811; H04L 43/0852; H04L 43/0858; H04L 43/0864; H04L 43/087; H04L 43/10; H04L 43/12; H04L 47/10; H04L 65/80; H04L 67/18; H04L 67/36; H04L 43/50; H04L 41/0873; H04L 41/142; H04L 41/145; H04L 41/147; H04L 41/18; H04L 41/069; H04L 41/5009; H04L 41/5032; H04L 41/5087;
(Continued)

(56) References Cited

U.S. PATENT DOCUMENTS

| 5,963,544 A * | 10/1999 | Ding | H04L 41/145 348/E7.054 |
|---|---|---|---|
| 7,085,238 B2 * | 8/2006 | McBeath | H04L 12/46 370/249 |

(Continued)

*Primary Examiner* — Greg C Bengzon
(74) *Attorney, Agent, or Firm* — Honigman LLP; Brett A. Krueger

(57) ABSTRACT

A method includes receiving user data packets from customer premises equipment (CPE) in communication with a network terminal over a communication link and enabling a network terminal-side loopback mode to establish a closed traffic test loop across the communication link between the network terminal and the CPE. The received user data packets indicate that a CPE-side loopback mode is enabled. The method also includes injecting a number of data bits into the closed traffic test loop until a saturation threshold of the communication link is satisfied, and when the number of data bits injected into the closed traffic test loop satisfies the saturation threshold, determining a packet error-rate of the number of data bits circulating in the closed traffic test loop. After determining the packet error-rate, the method also includes removing the closed traffic test loop across the communication link between the network terminal and the CPE.

20 Claims, 5 Drawing Sheets

(58) Field of Classification Search
CPC ............ H04L 43/0829; H04L 12/2856; H04L 12/2878; H04L 12/4641; H04L 41/0213; H04L 41/044; H04L 41/0645; H04L 41/0677; H04L 41/12; H04L 41/24; H04L 41/5003; G06F 11/0709; G06F 11/0769; G06F 11/079; H04M 3/26; H04M 3/30; H04M 7/0084; H04Q 11/0066; H04Q 11/0071; H04W 4/02

See application file for complete search history.

(56) References Cited

U.S. PATENT DOCUMENTS

| | | | | |
|---|---|---|---|---|
| 7,778,182 B2* | 8/2010 | Chiu | ................ | H04L 45/00 370/237 |
| 7,844,432 B1* | 11/2010 | Jones | ................ | H04L 43/50 370/395.53 |
| 7,864,692 B1 | 1/2011 | Hench | ................ | H04B 3/32 370/252 |
| 8,005,012 B1* | 8/2011 | Aybay | ................ | H04L 43/02 370/232 |
| 8,014,314 B1* | 9/2011 | Burke | ................ | H04L 43/50 370/248 |
| 8,036,132 B1* | 10/2011 | Beattie, Jr. | .......... | H04L 41/5074 370/242 |
| 8,407,034 B2* | 3/2013 | Bostoen | ............... | H04B 3/46 703/13 |
| 8,705,368 B1* | 4/2014 | Abts | ................ | H04L 47/10 370/238 |
| 9,025,490 B2* | 5/2015 | Davari | ............... | H04L 41/5038 370/254 |
| 9,549,234 B1* | 1/2017 | Mascitto | ............ | H04Q 11/0071 |
| 2003/0016797 A1* | 1/2003 | Zakrzewski | ............ | H04L 47/10 379/93.32 |
| 2003/0225905 A1* | 12/2003 | Scifres | ............... | H04L 47/10 709/234 |
| 2004/0146072 A1* | 7/2004 | Farmwald | ............ | H04L 12/2856 370/537 |
| 2005/0123027 A1* | 6/2005 | Cioffi | ................ | H04B 3/32 375/222 |
| 2006/0098670 A1* | 5/2006 | Voit | ................ | H04L 41/0253 370/401 |
| 2006/0098725 A1* | 5/2006 | Rhee | ................ | H04B 3/48 375/222 |
| 2007/0140135 A1* | 6/2007 | Sheppard | ........... | H04L 41/5032 370/250 |
| 2008/0031151 A1* | 2/2008 | Williams | ............ | H04L 41/5009 370/252 |
| 2008/0037420 A1* | 2/2008 | Tang | ................ | H04L 1/1607 370/229 |
| 2008/0049638 A1* | 2/2008 | Ray | ................ | H04L 41/0896 370/252 |
| 2008/0052387 A1* | 2/2008 | Heinz | ................ | H04L 41/5025 709/223 |
| 2008/0052394 A1* | 2/2008 | Bugenhagen | ........... | H04L 12/14 709/224 |
| 2008/0162678 A1* | 7/2008 | Wang | ................ | H04L 41/5074 709/223 |
| 2008/0205501 A1* | 8/2008 | Cioffi | ................ | H04L 41/0803 375/224 |
| 2009/0028170 A1* | 1/2009 | Jiang | ................ | H04L 12/2856 370/406 |
| 2009/0034429 A1* | 2/2009 | Yokogawa | ............ | H04L 1/24 370/253 |
| 2009/0161566 A1* | 6/2009 | Sridhar | ............... | H04L 12/2856 370/252 |
| 2009/0161741 A1* | 6/2009 | Ginis | ................ | H04M 3/304 375/224 |
| 2010/0002591 A1* | 1/2010 | Mizutani | ............ | H04L 43/0852 370/241.1 |
| 2010/0091785 A1* | 4/2010 | Monzawa | ............ | H04L 47/10 370/412 |
| 2010/0172251 A1* | 7/2010 | Adam | ................ | H04L 41/12 370/252 |
| 2010/0281518 A1* | 11/2010 | Bugenhagen | ........... | H04L 41/50 726/3 |
| 2010/0322085 A1* | 12/2010 | Kalbag | ............... | H04L 12/4641 370/249 |
| 2011/0113455 A1* | 5/2011 | Wu | ................ | H04L 12/2801 725/82 |
| 2011/0242976 A1* | 10/2011 | Gusat | ................ | H04L 47/10 370/230 |
| 2011/0268435 A1* | 11/2011 | Mizutani | ............ | H04L 45/22 398/5 |
| 2011/0318009 A1* | 12/2011 | Shiba | ................ | H04L 12/2885 398/67 |
| 2012/0039187 A1* | 2/2012 | Yang | ................ | H04B 3/46 370/249 |
| 2012/0063332 A1* | 3/2012 | Hanes | ................ | H04L 43/50 370/249 |
| 2012/0233308 A1* | 9/2012 | Van De Houten | ...... | H04L 43/10 709/224 |
| 2012/0243410 A1* | 9/2012 | Vedula | ............... | H04L 41/5025 370/235 |
| 2012/0263065 A1* | 10/2012 | Sanchez Yanguela | ...................... | H04L 41/12 370/252 |
| 2012/0278378 A1* | 11/2012 | Lehane | ............... | H04L 41/5054 709/201 |
| 2013/0022178 A1* | 1/2013 | Rhee | ................ | H04L 12/2869 379/32.04 |
| 2013/0051247 A1* | 2/2013 | Reese | ................ | H04L 43/08 370/242 |
| 2013/0170628 A1* | 7/2013 | Alloin | ................ | H04L 43/0811 379/22 |
| 2013/0176857 A1* | 7/2013 | Turner | ................ | H04L 43/50 370/241 |
| 2013/0201844 A1* | 8/2013 | Berg | ................ | H04L 1/0001 370/252 |
| 2013/0219048 A1* | 8/2013 | Arvidsson | ........... | H04L 41/5025 709/224 |
| 2013/0322255 A1* | 12/2013 | Dillon | ................ | H04L 47/22 370/236 |
| 2013/0322285 A1* | 12/2013 | Fidler | ................ | H04L 43/0882 370/252 |
| 2013/0343207 A1* | 12/2013 | Cook | ................ | H04L 43/0852 370/252 |
| 2013/0343378 A1* | 12/2013 | Veteikis | ............... | H04L 49/555 370/389 |
| 2013/0343379 A1* | 12/2013 | Stroud | ................ | H04L 43/06 370/389 |
| 2013/0343390 A1* | 12/2013 | Moriarty | ............ | H04L 43/0852 370/392 |
| 2013/0346814 A1* | 12/2013 | Zadigian | ............ | G01R 31/28 714/724 |
| 2013/0347103 A1* | 12/2013 | Veteikis | ............... | H04L 43/04 726/22 |
| 2014/0016479 A1* | 1/2014 | Coomber | ............ | H04L 12/413 370/241.1 |
| 2014/0022886 A1* | 1/2014 | Sinha | ................ | H04L 43/0811 370/216 |
| 2014/0066098 A1* | 3/2014 | Stern | ................ | H04W 4/043 455/456.3 |
| 2014/0092880 A1* | 4/2014 | Wang | ................ | H04L 5/0007 370/336 |
| 2014/0254394 A1* | 9/2014 | Hayes | ................ | H04L 12/4641 370/245 |
| 2015/0016278 A1* | 1/2015 | Hayes | ................ | H04L 43/0864 370/249 |
| 2015/0030138 A1* | 1/2015 | Kalavai | ............... | H04M 3/32 379/1.03 |
| 2015/0055692 A1* | 2/2015 | Pathak | ............... | H04B 3/46 375/227 |
| 2015/0124587 A1* | 5/2015 | Pani | ................ | H04L 12/18 370/221 |
| 2015/0149611 A1* | 5/2015 | Lissack | ............... | H04L 43/0817 709/224 |

(56) References Cited

U.S. PATENT DOCUMENTS

| | | | |
|---|---|---|---|
| 2015/0295808 A1* | 10/2015 | O—Malley | H04L 47/22 709/224 |
| 2016/0028633 A1* | 1/2016 | Durand | H04L 43/0882 370/236 |
| 2016/0073180 A1* | 3/2016 | Khotimsky | H04Q 11/0067 398/34 |
| 2016/0080243 A1* | 3/2016 | Kodama | H04L 41/0806 370/252 |
| 2016/0087864 A1* | 3/2016 | Kerpez | H04L 1/20 370/242 |
| 2016/0205008 A1* | 7/2016 | Dasu | H04L 43/0888 709/224 |
| 2016/0212031 A1* | 7/2016 | Jain | H04L 43/0876 |
| 2016/0248656 A1* | 8/2016 | Anand | H04L 47/22 |
| 2016/0254973 A1* | 9/2016 | Joanny | H04L 43/08 370/241 |
| 2016/0337212 A1* | 11/2016 | Shanks | H04L 67/10 |
| 2017/0005940 A1* | 1/2017 | Haegdorens | H04M 11/062 |
| 2017/0018174 A1* | 1/2017 | Gerszberg | H04L 12/1845 |
| 2017/0346705 A1* | 11/2017 | Szilagyi | H04L 43/08 |
| 2018/0062973 A1* | 3/2018 | Tran | H04L 43/065 |
| 2018/0295231 A1* | 10/2018 | Marigliano | H04L 43/0876 |

* cited by examiner

LINE RATE ETHERNET TRAFFIC TESTING

CROSS REFERENCE TO RELATED APPLICATIONS

This U.S. patent application claims priority under 35 U.S.C. § 119(e) to U.S. Provisional Application 62/379,219, filed on Aug. 24, 2016. The disclosure of this prior application is considered part of the disclosure of this application and is hereby incorporated by reference in its entireties.

TECHNICAL FIELD

This disclosure relates to testing line rate Ethernet traffic.

BACKGROUND

In a fiber-to-home network, the optical links between an optical line terminal (OLT) and an optical network terminal (ONU) carry Ethernet traffic. The OLT, located at a service provider's central office, performs conversion between the electrical signals used by a service provider's equipment and the fiber optic signals to be carried by optical fibers to a number of ONUs, located near a customer's equipment. The physical link between the service provider's equipment and the customer's equipment is known a "last mile". Occasional testing of optical links is important to ensure high quality traffic-rate for the end users.

The Institute of Electrical and Electronics Engineers (IEEE) 802.1 committee developed the IEEE 802.1ag standard and the International Telecommunication Union (ITU) Telecommunication Standardization Sector (ITU-T) SG 13 Q5 WG developed the Y.1731 standard for Ethernet service Operations, administration, and Management (OAM) for connectivity fault management and performance management. Currently, some existing products implement these Ethernet OAM standards and support for performance management such as frame loss measurement. However, traditional implementation of these Ethernet OAM services requires additional processing power, and therefore, suffer from a scalability point of view. Further, as OAM traffic is unable to reach line-rate during testing, frame loss detection and packet-error rate measurement are only meaningful for severe lossy links.

SUMMARY

One aspect of the disclosure provides a method for performing a line-rate traffic test across a communication link connecting a network terminal and customer premises equipment (CPE). The method includes receiving, at data processing hardware of the network terminal, user data packets from the CPE in communication with the network terminal over the communication link, the received user data packets indicating that a CPE-side loopback mode is enabled. In response to receiving the user data packets from the CPE, the method also includes enabling, by the data processing hardware, a network terminal-side loopback mode at the network terminal to establish a closed traffic test loop across the communication link between the network terminal and the CPE, and injecting, by the data processing hardware, a number of data bits into the closed traffic test loop until a saturation threshold of the communication link is satisfied. When the number of data bits injected into the closed traffic test loop satisfies the saturation threshold, the method also includes determining, by the data processing hardware, a packet error-rate of the number of data bits circulating in the closed traffic test loop. After determining the packet error-rate, the method also includes removing, by the data processing hardware, the closed traffic test loop across the communication link between the network terminal and the CPE.

Implementations of the disclosure may include one or more of the following optional features. In some implementations, prior to receiving the user data packets from the CPE, the method also includes sending, by the data processing hardware, a traffic test message to the CPE that requests the CPE to enable the CPE-side loopback mode. Additionally, the CPE may be configured to initiate a timer in response to receiving the traffic test message, and disable the CPE-side loopback mode at the end of the timer to remove the closed traffic test loop across the communication link between the network terminal and the CPE.

In some examples, enabling the network terminal-side loopback mode includes instructing Ethernet switches at the network terminal to operate in a loopback enabled state. Here, the loopback enabled state of the Ethernet switches causes the network terminal to return the user data packets back to the CPE to establish the closed traffic test loop. The saturation threshold of the communication link may be satisfied when a traffic rate across the communicating link reaches a line-rate. In some configurations, injecting the number of data bits into the closed traffic loop until the saturation threshold of the communication link is satisfied includes generating a number of testing packets required to saturate the communication link based on a length of the communication link between the network terminal and the CPE, and injecting the generated number of testing packets into the closed traffic test loop. The testing packets may be different than the user data packets.

In some implementations, the method further includes determining, by the data processing hardware, whether the packet error-rate of the number of data bits circulating in the closed traffic test loop satisfies a lossy link threshold. In these implementations, when the packet error-rate satisfies the lossy link threshold, the method also includes determining, by the data processing hardware, the communication link between the network terminal and the CPE includes a lossy link. The removing the closed traffic test loop may include sending a test termination message from the data processing hardware to the CPE, and disabling the network terminal-side loopback mode to remove the closed traffic test loop cross the communication link between the network terminal and the CPE. The test termination message when received by the CPE, causes the CPE to disable the CPE-side loopback mode at the ONU. In some examples, disabling the network terminal-side loopback mode includes instructing Ethernet switches at the network terminal to operate in a loopback disabled state. The network terminal may include an optical network terminal and the CPE may include an optical network unit.

Another aspect of the disclosure provides for performing a line-rate traffic test across a communication link connecting a network terminal and customer premises equipment (CPE). The system includes the CPE and the network terminal. The network terminal includes data processing hardware and memory hardware in communication with the data processing hardware. The memory hardware stores instructions that when executed on the data processing hardware cause the data processing hardware to perform operations that include receiving user data packets from the CPE in communication with the network terminal over the communication link, the received user data packets indicating that a CPE-side loopback mode is enabled. In response to receiving the user data packets from the CPE, the operations further include enabling a network terminal-side loopback mode at the network terminal to establish a closed traffic test loop across the communication link between the network terminal and the CPE, and injecting a number of data bits into the closed traffic test loop until a saturation threshold of the communication link is satisfied. When the number of data bits injected into the closed traffic test loop satisfies the saturation threshold, the operations also include determining a packet error-rate of the number of data bits circulating in the closed traffic test loop. After determining the packet error-rate, the operations also include removing the closed traffic test loop across the communication link between the network terminal and the CPE.

This aspect may include one or more of the following optional features. In some implementations, prior to receiving the user data packets from the CPE, the operations also include sending a traffic test message to the CPE that requests the CPE to enable the CPE-side loopback mode. Additionally, the CPE may be configured to initiate a timer in response to receiving the traffic test message, and disable the CPE-side loopback mode at the end of the timer to remove the closed traffic test loop across the communication link between the network terminal and the CPE.

In some examples, enabling the network terminal-side loopback mode includes instructing Ethernet switches at the network terminal to operate in a loopback enabled state. Here, the loopback enabled state of the Ethernet switches causes the network terminal to return the user data packets back to the CPE to establish the closed traffic test loop. The saturation threshold of the communication link may be satisfied when a traffic rate across the communicating link reaches a line-rate. In some configurations, injecting the number of data bits into the closed traffic loop until the saturation threshold of the communication link is satisfied includes generating a number of testing packets required to saturate the communication link based on a length of the communication link between the network terminal and the CPE, and injecting the generated number of testing packets into the closed traffic test loop. The testing packets may be different than the user data packets.

In some implementations, the operations also include determining whether the packet error-rate of the number of data bits circulating in the closed traffic test loop satisfies a lossy link threshold. In these implementations, when the packet error-rate satisfies the lossy link threshold, the operations also include determining the communication link between the network terminal and the CPE includes a lossy link. The removing the closed traffic test loop may include sending a test termination message from the data processing hardware to the CPE, and disabling the network terminal-side loopback mode to remove the closed traffic test loop cross the communication link between the network terminal and the CPE. The test termination message when received by the CPE, causes the CPE to disable the CPE-side loopback mode at the ONU. In some examples, disabling the network terminal-side loopback mode includes instructing Ethernet switches at the network terminal to operate in a loopback disabled state. The network terminal may include an optical network terminal and the CPE may include an optical network unit.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

During installation and turn-up of a fiber-to-home network, the physical connections for the optical links between an optical line terminal (OLT) and an optical network terminal (ONU) are first tested using optical equipment, and then layer-2 Ethernet traffic is tested to ensure end-to-end networking connectivity on the links. To detect a lossy link caused by dirty connectors, bent optical cables, or flaky Ethernet interfaces, "line-rate traffic" tests should be run so that a packet-error rate of a link can be measured. Software-generated Ethernet traffic tests, such as L3 ping, are slow and unable to reach line-rate of the physical link, and therefore, such line-rate traffic tests are not capable of detecting lossy links. Moreover, software-generated line-rate traffic tests require hardware-based traffic generators and testers which in turn increases the testing costs. Implementations herein are directed toward a method and system for performing line-rate Ethernet traffic testing over the OLT-ONU link without using CPU processing power and without using specialized traffic generators/testers. Namely, implementations herein rely on the OLT to use local Ethernet switches to operate in a loopback mode while also requesting the ONU, or other client-side device, to enter the loopback mode to form a closed loop for circulating data frames in both the uplink and downlink directions until the OLT-ONU link is saturated to a point at which the Ethernet traffic rate across the link reaches line-rate. Thereafter, the OLT may determine a packet error-rate of the circulating data frames to detect lossy links between the ONU and OLT that may be caused by one or more of dirty connectors, bent optical cables, flaky Ethernet interfaces, or other faults across the connection between the ONU and the OLT.

Figure 1:
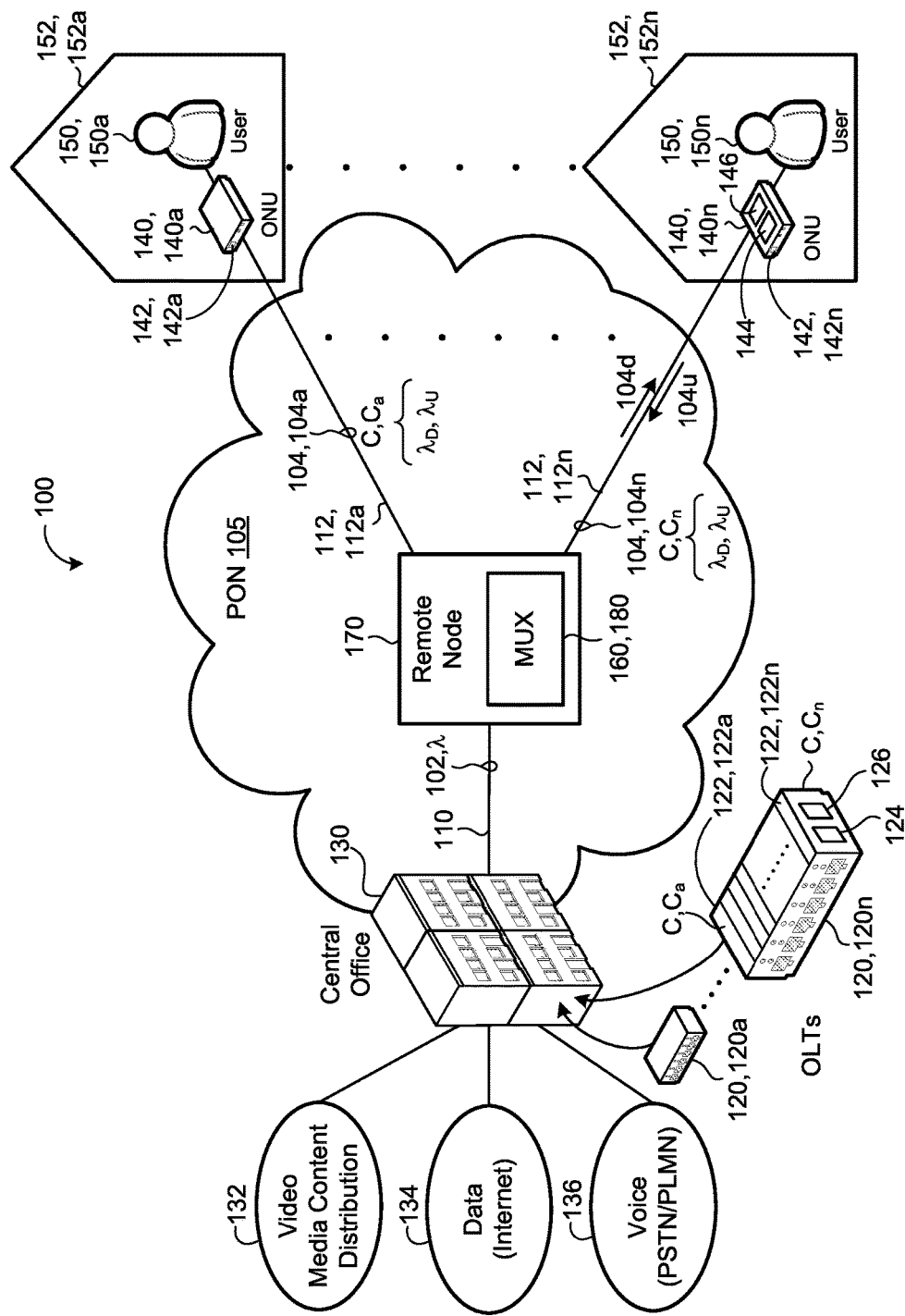
FIG. 1 is a schematic view of an example communication system.

Referring to FIG. 1, a communication system 100 delivers communication signals 102 (e.g., optical signals) through communication links 110, 112, 112a-n (e.g., optical fibers or line-of-sight free space optical communications) between an optical line terminal (OLT) 120 housed in a central office (CO) 130 and optical network units (ONUs) 140, 140a-n (e.g., a bidirectional optical transceiver) associated with users 150, 150a-n (also referred to as customers or subscribers). The ONUs 140, 140a-n are typically located at premises 152, 152a-n of the users 150, 150a-n.

Customer premises equipment (CPE) is any terminal and associated equipment located at the premises 152 of the user 150 and connected to a carrier telecommunication channel C at a demarcation point ("demarc"). In the examples shown, the ONU 140 is a CPE. The demarc is a point established in a house, building, or complex to separate customer equipment from service provider equipment. CPE generally refers to devices such as telephones, routers, switches, residential gateways (RG), set-top boxes, fixed mobile convergence products, home networking adapters, or Internet access gateways that enable the user 150 to access services of a communications service provider and distribute them around the premises 152 of the user 150 via a local area network (LAN).

In some implementations, the optical communication system 100 implements an optical access network 105, such as a passive optical network (PON) 105, for example, for access and mobile fronthaul/backhaul networks. In some examples, the optical communication system 100 implements a point-to-point (pt-2-pt) PON having direct connections, such as optical Ethernets, where a home-run optical link 110, 112 (e.g., fiber) extends all the way back to an OLT 120 at the CO 130 and each customer 150, 150a-n is terminated by a separate OLT 120a-n. In other examples, the optical communication system 100 implements a point-to-multi-point (pt-2-multi-pt) PON, where a shared OLT 120 services multiple customers 150, 150a-n.

The CO 130 includes at least one OLT 120 connecting the optical access network 105 to an Internet Protocol (IP), Asynchronous Transfer Mode (ATM), or Synchronous Optical Networking (SONET) backbone, for example. Therefore, each OLT 120 is an endpoint of the PON 105 and converts between electrical signals used by service provider equipment and optical signals 102 used by the PON 105. Each OLT 120, 120a-n includes at least one transceiver 122, 122a-n, depending on the implementation of the optical access network 105. The OLT 120 sends the optical signal 102 via a corresponding transceiver 122, through a feeder fiber 110 to a remote node (RN) 170, which includes a band-multiplexer 160 configured to demultiplex the optical signal 102 and distribute demulitplexed optical signals 104 to multiple users 150, 150a-n along corresponding distribution fibers 112, 112a-n. The band-multiplexer 160 for multiplexing/demultiplexing may be an arrayed wavelength grating 180 (AWG), which is a passive optical device. In some examples, each CO 130 includes multiple OLTs 120, 120a-n, and each OLT 120 is configured to service a group of users 150. In addition, each OLT 120 may be configured to provide signals in different services, e.g., one OLT 120 may provide services in 1G-PON, while another OLT 120 provides services in 10G-PON.

As shown in FIG. 1, the CO 130 multiplexes signals received from several sources, such as a video media distribution source 132, an Internet data source 134, and a voice data source 136, and multiplexes the received signals into one multiplexed signal 102 before sending the multiplexed optical signal 102 to the RN 170 through the feeder fiber 110. The multiplexing may be performed by the OLT 120 or a broadband network gateway (BNG) positioned at the CO 130. Typically, services are time-division-multiplexed on the packet layer.

Time-division-multiplexing (TDM) is a method of transmitting and receiving independent signals over a common signal path by using different, non-overlapping time slots. Wavelength division multiplexing (WDM) uses multiple wavelengths λ to implement point-to-multi-point communications in the PON 105. The OLT 120 serves multiple wavelengths through one fiber 110 to the band-multiplexer 160 at the RN 170, which multiplexes/demultiplexes signals between the OLT 120 and a plurality of ONUs 140, 140a-n. Multiplexing combines several input signals and outputs a combined signal. Time wavelength division multiplexing (TWDM) uses both time and wavelength dimensions to multiplex signals.

The OLT 120 may include one or more optical transceivers 122, 122a-n. Each optical transceiver 122 transmits signals at one fixed wavelength $\lambda_D$ (referred to as a downstream wavelength) and receives optical signals 102 at one fixed wavelength $\lambda_U$ (referred to as an upstream wavelength). The downstream and upstream wavelengths $\lambda_D$, $\lambda_U$ may be the same or different. Moreover, a channel C may define a pair of downstream and upstream wavelengths $\lambda_D$, $\lambda_U$, and each optical transceiver 122, 122-n of a corresponding OLT 120 may be assigned a unique channel $C_{a-n}$.

The OLT 120 multiplexes/demultiplexes the channels C, $C_{a-n}$ of its optical transceivers 122, 122a-n for communication of an optical signal 102 through the feeder fiber 110. Whereas, the band-multiplexer 160 at the RN 170 multiplexes/demultiplexes optical signals 102, 104, 104-n between the OLT 120 and a plurality of ONUs 140, 140a-n. For example, for downstream communications, the band-multiplexer 160 demultiplexes the optical signal 102 from the OLT 120 into ONU optical signals 104, 104a-n, i.e., downstream optical signals 104d, for each corresponding ONU 140, 140a-n. For upstream communications, the band-multiplexer 160 multiplexes ONU optical signals 104, 104a-n from each corresponding ONU 140, 140a-n, i.e., upstream optical signals 104u, into the optical signal 102 for delivery to the OLT 120. To make the transmission successful, the optical transceivers 122, 122a-n of the OLT 120 match with the ONUs 140, 140a-n one-by-one. In other words, the downstream and upstream wavelengths $\lambda_D$, $\lambda_U$ (i.e., the channel C) of respective downstream and upstream optical signals 104d, 104u to and from a given ONU 140 matches the downstream and upstream wavelengths $\lambda_D$, $\lambda_U$ (i.e., the channel C) of a corresponding optical transceiver 122.

In some implementations, each ONU 140, 140a-n includes a corresponding tunable ONU transceiver 142, 142a-n (e.g., that includes a laser or light emitting diode) that can tune to any wavelength λ used by a corresponding OLT 120 at a receiving end. The ONU 140 may automatically tune the tunable ONU transceiver 142 to a wavelength λ that establishes a communication link between the corresponding OLT 120 and the ONU 140. Each optical transceiver 122, 142 may include data processing hardware 124, 144 (e.g., circuitry, field programmable gate arrays (FPGAs, etc.) and memory hardware 126, 146 in communication with the data processing hardware 124, 144. The memory hardware 126, 146 may store instructions (e.g., via firmware) that when executed on the data processing hardware 124, 144 cause the data processing hardware 124, 144 to perform operations for executing in a loopback mode to form a closed-loop between the OLT 120 and the corresponding ONU 140. The ONU 140 may include a photodetector that converts the optical wave to an electric form. The electrical signal may be further de-multiplexed down to subcomponents (e.g., data over a network, sound waves converted into currents using microphones and back to its original physical form using speakers, converting images converted into currents using video cameras and converting back to its physical form using a television).

Figure 2A:
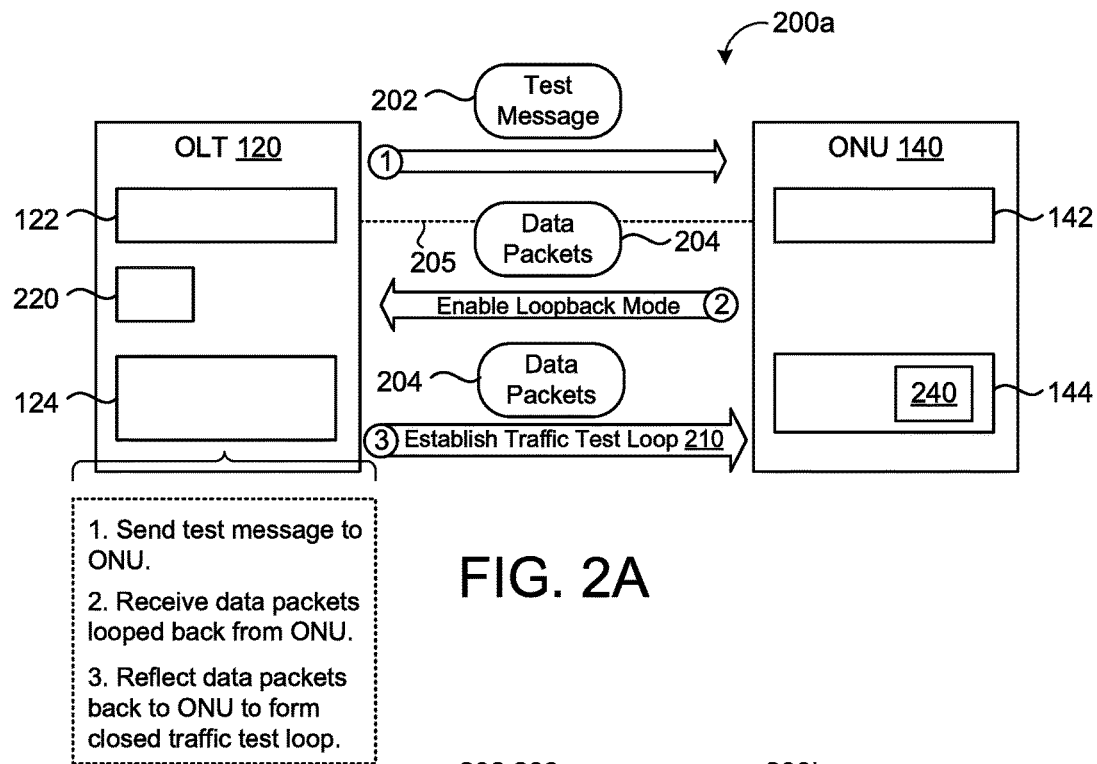
FIGS. 2A-2C are schematic views of an optical network terminal and an optical network unit establishing a closed traffic test loop to perform a line-rate traffic test across a communication link.
Figure 2B:
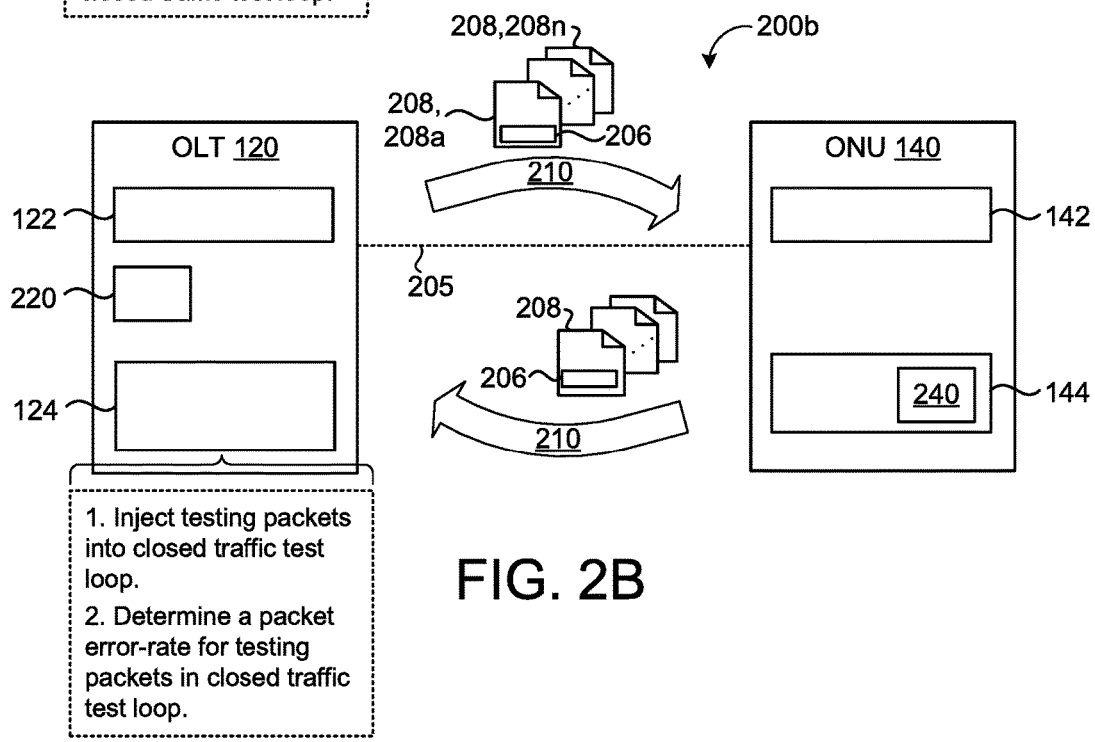
Figure 2C:
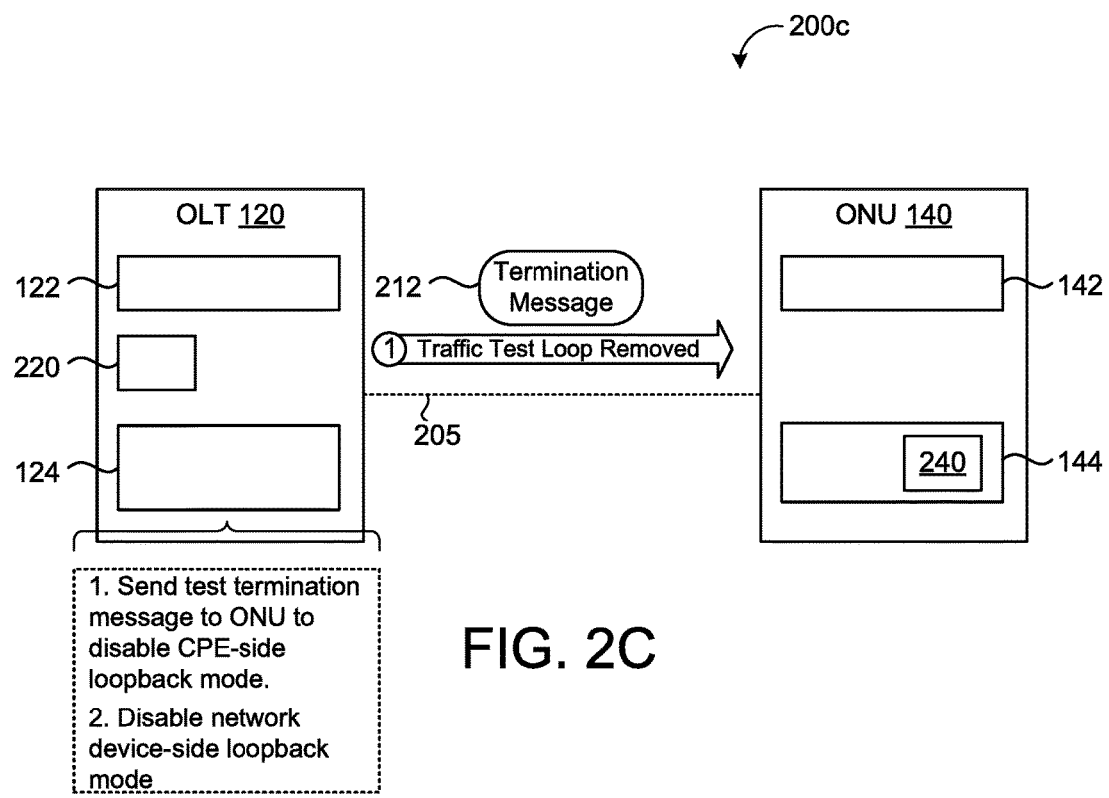

Referring to FIGS. 2A-2C, in some implementations, schematic views 200a-200c show an OLT 120 (i.e., network terminal) and an ONU 140 (i.e., customer premise equipment (CPE)) forming a closed traffic test loop 210 to perform a line-rate traffic test across a communication link 205 connecting the OLT 120 and the ONU 140. The communication link 205 may correspond to any combination of the communication links 110, 112 (e.g., optical fibers or line-of-sight free space optical communications) between the OLT 120 and the ONU 140. In the example shown, the communication link 205 corresponds to a "last mile" physical link connecting the OLT 120 and the ONU 140. While the example depicts performing the line-rate traffic test across the communication link 205 between the OLT 120 and the ONU 140, the line-rate traffic test may be performed across any end-to-end link between any network terminal and CPE of a network.

FIG. 2A shows the OLT 120 (or other network terminal) sending a traffic test message 202 to the ONU 140 (or other CPE) that requests the ONU 140 to enable a CPE-side loopback mode. In some examples, the traffic test message 202 corresponds to a vendor-specific Operations, Administration, and Management (OAM) message that requests the ONU 140 to enable the CPE-side loopback mode for looping back user data packets 204. For instance, the OAM message may include a vendor-specific message (VSM) or a vendor-specific reply (VSR). In some configurations, the CPE-side loopback mode remains enabled at the ONU 140 until the ONU 140 receives a termination test message 212 (FIG. 2C) from the OLT 120 that causes the ONU 140 to disable the CPE-side loopback mode. In other configurations, a physical layer (PHY) of the ONU 140 includes a remote loopback feature that causes the ONU 140 to set a timer 240 upon enabling the CPE-side loopback mode and disable the CPE-side loopback mode when the timer 240 lapses. The timer 240 may be set for a length of time suitable for performing the line-rate traffic test across the communication link 205.

After sending the traffic test message 202 to the ONU 140, the data processing hardware 124 at the OLT 120 may receive, via the transceiver 122, the user data packets 204 from the ONU 140 that indicate the CPE-side loopback mode is enabled. Thereafter, the data processing hardware 124 of the OLT 120 enables a network terminal-side loopback mode to establish the closed traffic test loop 210 across the communication link 205 between the OLT 120 and the ONU 140. In the example shown, the OLT 120 reflects the user data packets 204 back to the ONU 140 upon enabling the network terminal-side loopback mode. Here, the user data packets 204 may circulate between the OLT 120 and the ONU 140 in both the uplink and downlink directions. In some implementations, the data processing hardware 124 enables the network terminal-side loopback mode by instructing Ethernet switches 220 at the OLT 120 to operate in a loopback enabled state. Operating the Ethernet switches 220 in the loopback enabled state may cause the OLT 120 to reflect and return the user data packets 204 to the ONU 140 to establish the closed traffic test loop 210.

Referring to FIG. 2B, in some implementations, the OLT 120 injects a number of data bits 206 into the closed traffic test loop, and when the number of data bits 206 injected into the closed traffic test loop 210 satisfies a saturation threshold of the communication link 205, the OLT 120 determines a packet error-rate for the injected data bits 206 circulating in the closed traffic test loop 210. In other configurations, the ONU 140 (via the data processing hardware 144) may inject the data bits 206 into the closed traffic test loop 210. As used herein, the saturation threshold corresponds a required number of data bits 206 circulating in the closed traffic test loop 210 that causes a traffic rate across the communication link 205 to reach a line-rate. Here, the line-rate may refer to the data transmission speed of the communication link 205. For instance, the line-rate for Gigabit Ethernet is 1.25 Gigabits per second (Gbps).

In the example shown, the data processing hardware 124 at the OLT 120 generates a number of testing packets 208, 208a-n required to saturate the communication link 205 and injects the generated number of testing packets 208 into the closed traffic test loop 210. Each testing packet 208 may contain a known number of data bits 206. Accordingly, the generated number of testing packets 208 may be selected to provide the corresponding number of data bits 206 that satisfies the saturation threshold. In some examples, the data processing hardware 124 dynamically calculates the number of testing packets 208 required to saturate the communication link 205 based on a length of the communication link 205 between the OLT 120 and the ONU 140. For instance, when the communication link 205 is a "last mile" link configured to provide one (1) Gigabit Ethernet over 20 kilometers (km), the OLT 120 may generate and inject about 30 initial testing packets 208 to saturate the communication link 205 with the number of data bits 206 satisfying the saturation threshold, i.e., Ethernet traffic across the link 205 reaching the line-rate.

The testing packets 208 injected into the closed traffic test loop 210 may include Ethernet packets that may be different than and, thus, distinguishable from the user data packets 204 already circulating in the closed traffic test loop 210. Accordingly, when the number of data bits 206 injected into the closed traffic test loop 210 satisfies the saturation threshold, the data processing hardware 124 determines a packet error-rate of the data bits 206 circulating in the closed traffic test loop 210. For instance, hardware-based counters and/or error counters may be implemented at an Ethernet port/interface of the OLT 120 (i.e., at the transceiver 122) to calculate packet error-rate, frame loss detection, and traffic rate. In some examples, the data processing hardware 124 determines whether the packet error-rate of the number of data bits 206 satisfies a lossy link threshold. Here, the lossy link threshold corresponds to an error-rate value indicative of the communication link 205 being a lossy link. Thus, in these examples, when the packet error-rate satisfies the lossy link threshold, the data processing hardware 124 determines the communication link 205 between the OLT 120 (i.e., network terminal) and the ONU 140 (i.e., CPE) includes a lossy link. The lossy link may be caused by, without limitation, dirty connectors, bent optical cables, and/or flaky Ethernet interfaces. While the packet-error rate measurement is used for detecting lossy links, frame loss measurements of the testing packets 208 circulating in the closed traffic test loop 210 may also be used for detecting lossy links without departing from the scope of the present disclosure. Notably, forming the closed traffic test loop 210 between the OLT 120 and the ONU 140, and then injecting the number of data bits 206 into the loop 210 until the communication link 205 reaches a line-rate, allows for line-rate traffic testing to detect lossy links without incurring the increased costs associated with the use of hardware-based traffic generators and testers. Moreover, once the required number of data bits 206 are injected into the loop 210 to saturate the link 205 (e.g., the number of data bits 206 satisfies the saturation threshold), the OLT 120 may cease generating additional data bits 206 for injection into the loop 210, and therefore, processing power is conserved at the OLT 120. In other scenarios, the ONU 140 may determine the packet error-rate of the data bits 206 circulating in the closed traffic test loop 210.

Referring to FIG. 2C, in some implementations, the OLT 120 removes the closed traffic test loop 210 across the communication link 205 between the OLT 120 and the ONU 140 after determining the packet error-rate (or measuring frame loss). In some examples, the OLT 120 sends a test termination message 212 to the ONU 140, and when the ONU 140 receives the test termination message 212, the ONU 140 disables the CPE-side loopback mode at the ONU 140. As with the traffic test message 202, the test termination message 212 may correspond to a vendor-specific OAM message that requests the ONU 140 to disable the CPE-side loopback mode for end the circulation of the testing packets 208 (and also the user data packets 204) between the OLT 120 and the ONU 140. Additionally, the OLT 120 disables the network terminal-side loopback mode to remove the closed traffic test loop 210 across the communication link 205. For instance, the OLT 120 may disable the network terminal-side loopback mode by instructing the Ethernet switches 220 to operate in a loopback disabled state. In some configurations, the ONU 140 disables the CPE-side loopback mode when the timer 240 lapses.

Figure 3:
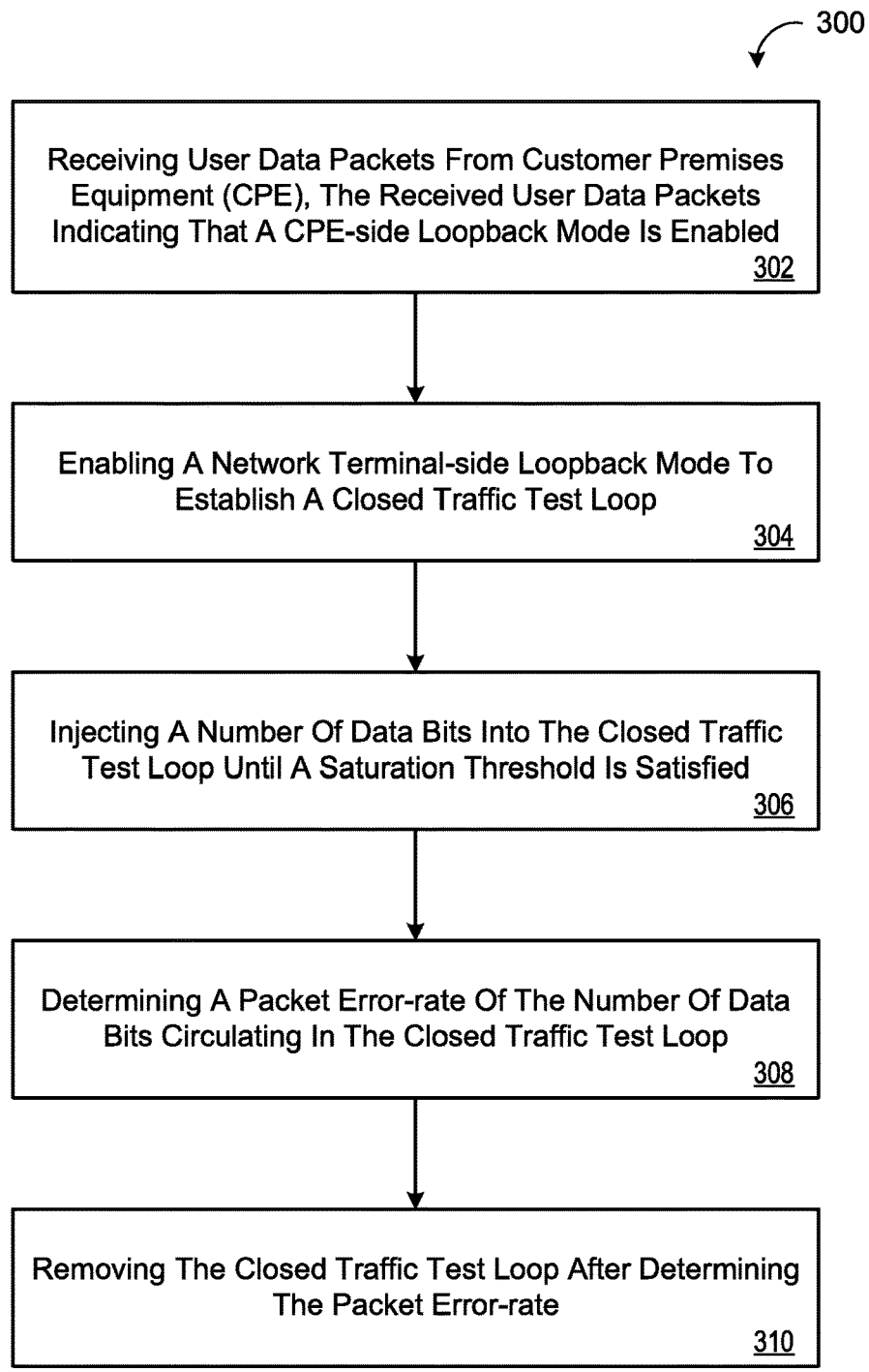
FIG. 3 is a flowchart of an example method for establishing a closed traffic test loop to perform a line-rate traffic test across a communication link connecting a network terminal and customer premises equipment.

FIG. 3 is a flowchart 300 of an example method for establishing a closed traffic test loop 210 to perform a line-rate traffic test across a communication link 205 connecting a network terminal (e.g., OLT 120) and customer premises equipment (CPE) (e.g. ONU 140). The flowchart 300 starts at operation 302 where data processing hardware 124 of the network terminal 120 receives user data packets 204 from the CPE 140. The received user data packets 204 indicate that a CPE-side loopback mode is enabled. Here, the enabled CPE-side loopback mode corresponds to the CPE 140 closing an end of the traffic test loop so that the CPE 140 can loopback the user data packets 204 to the network terminal 120 over the communication link 205. In some examples, the network terminal 120 initially sends a traffic test message 202 to the CPE 140 that requests the CPE 140 to enable the CPE-side loopback mode.

At operation 304, in response to receiving the user data packets 204 from the CPE 140, the data processing hardware 124 enables a network terminal-side loopback mode at the network terminal 120 to establish the closed traffic test loop 210 across the communication link 205 between the network terminal 120 and the CPE 140. In some implementations, the data processing hardware 124 enables the network terminal-side loopback mode by instructing Ethernet switches 220 at the network terminal 120 to operate in a loopback enabled state. Operating the Ethernet switches 220 in the loopback enabled state may cause the network terminal 120 to reflect and return the user data packets 204 to the CPE 140 to establish the closed traffic test loop 210.

At operation 306, the data processing hardware 124 injects a number of data bits 206 into the closed traffic test loop 210 until a saturation threshold is satisfied. For instance, the saturation threshold of the communication link 205 may be satisfied when a traffic rate across the communication link 205 reaches a line-rate. In some examples, the injecting of the number of data bits 206 until the saturation threshold of the communication link 205 is satisfied includes generating a number of testing packets 208 required to saturate the communication link 205 based on a length of the communication link between the network terminal 120 and the CPE 140, and injecting the generated number of testing packets 208 into the closed traffic test loop 210. Here, the testing packets 208 may include special Ethernet packets that are different than the user data packets 204 already circulating in the closed traffic test loop 210. For instance, the Ethernet packets may include random patterns of Ethernet packets/frames in the payload, such that enough Ethernet packets in circulation causes the saturation of the link 205 with the data bits 206 and the Ethernet traffic reaching line-rate. In other configurations, the data processing hardware 144 of the CPE 140 inject the number of data bits 206 into the closed traffic test loop 210 by generating the special testing packets 208 for injection into the loop 210.

At operation 308, the data processing hardware 124 determines a packet error-rate of the number of data bits 206 circulating in the closed traffic test loop 210 when the saturation threshold is satisfied. In other configurations, the data processing hardware 144 of the CPE 140 may determine the packet error0rate of the circulating data bits 206 in addition to, or in lieu of, the data processing hardware 124 of the network terminal 120. To detect/determine whether or not the communication link 205 is a lossy link, the data processing hardware 124 may determine whether the packet error-rate of the number of data bits 206 circulating in the closed traffic test loop satisfies a lossy link threshold. For instance, any values of packet error-rate that are equal to or exceed a value defined by the lossy link threshold may be deemed to satisfy the lossy link threshold, thereby providing an indication of a lossy link. Here, the data processing hardware 124 determines the communication link 205 is lossy when the packet error-rate satisfies the lossy link threshold. Additionally or alternatively, the data processing hardware 124 may measure frame loss of the Ethernet packets/frames circulating in the closed traffic test loop 210 for detecting lossy links when the measured frame loss exceeds a frame loss detection threshold.

At operation 310, after determining the packet error-rate, the data processing hardware 124 removes the closed traffic test loop 210 across the communication link 205 between the network terminal 120 and the CPE 140. Here, the data processing hardware 124 may instruct the Ethernet switches 220 to transition from the loopback enabled state to a loopback disabled state. In some examples, the data processing hardware 124 sends a test termination message 212 to the CPE 140 that causes the CPE 140 to disable the CPE-side loopback mode. In other examples, the CPE 140 initiates a timer 240 upon enabling the CPE-side loopback mode and disables the CPE-side loopback mode when the timer 240 lapses. In these examples, the timer 240 may be set to an elapsed period of time sufficient for performing the line-rate traffic test. The traffic test message 202 may provide the elapsed period of time for the timer 240.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 4:
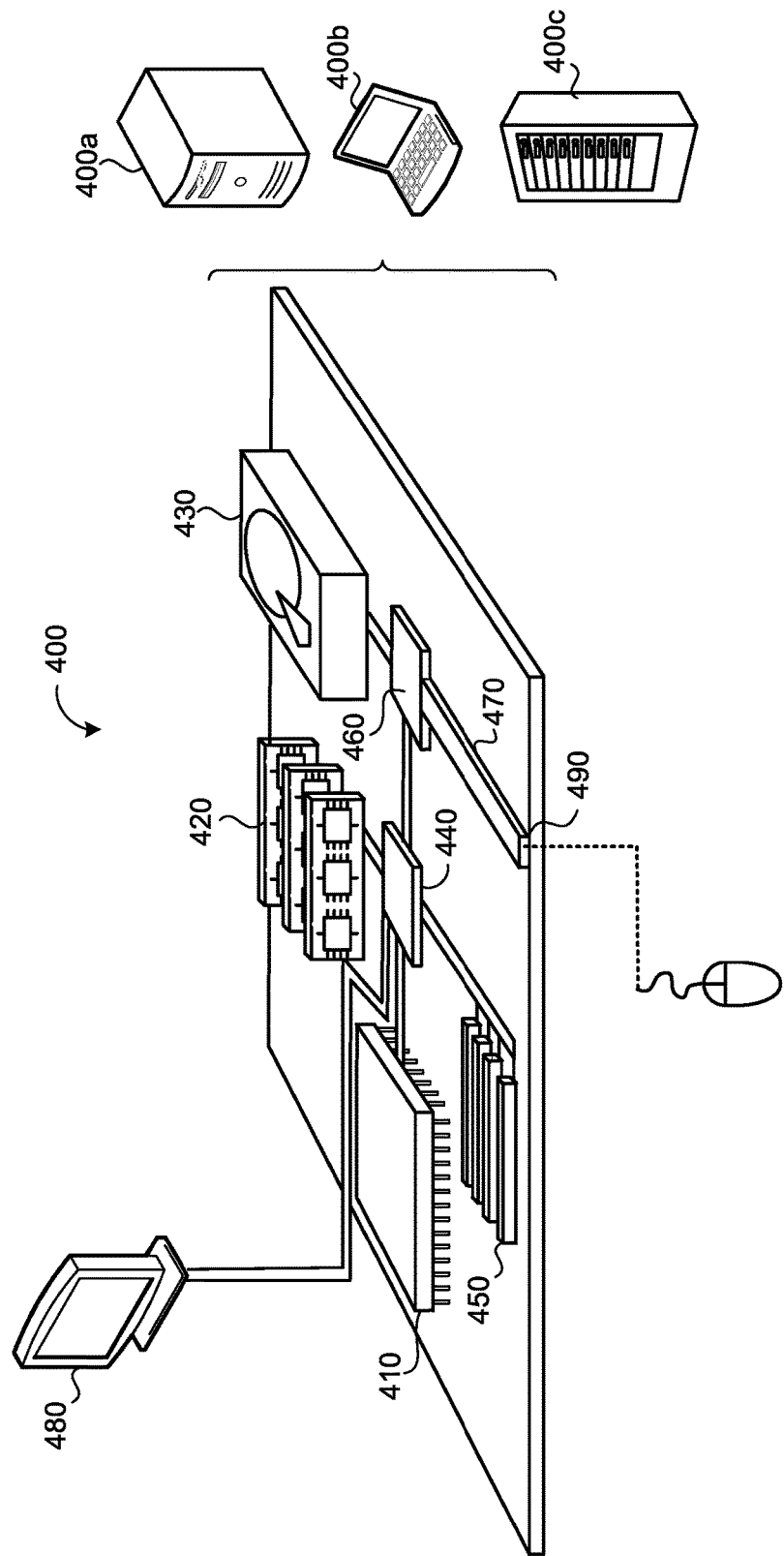
FIG. 4 is a schematic view of an example computing device.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 (e.g., data processing hardware 124, 144) can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 (e.g., memory hardware 126) stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware of a network terminal, user data packets from customer premises equipment (CPE) in communication with the network terminal over a communication link, the received user data packets indicating that a CPE-side loopback mode is enabled;
   in response to receiving the user data packets from the CPE, enabling, by the data processing hardware, a network terminal-side loopback mode at the network terminal to establish a closed traffic test loop across the communication link between the network terminal and the CPE;
   injecting, by the data processing hardware, a number of data bits into the closed traffic test loop until a saturation threshold of the communication link is satisfied, the saturation threshold of the communication link satisfied when the number of data bits circulating in the closed traffic test loop between the CPE and the network terminal in both uplink and downlink directions causes a traffic rate across the communication link to reach a line-rate;
   when the number of data bits injected into the closed traffic test loop satisfies the saturation threshold, determining, by the data processing hardware, a packet error-rate of the number of data bits circulating in the closed traffic test loop; and
   after determining the packet error-rate, removing, by the data processing hardware, the closed traffic test loop across the communication link between the network terminal and the CPE.

2. The method of claim 1, further comprising, prior to receiving the user data packets from the CPE, sending, by the data processing hardware, a traffic test message to the CPE, the traffic test message requesting the CPE to enable the CPE-side loopback mode.

3. The method of claim 2, wherein the CPE is configured to initiate a timer in response to receiving the traffic test message, and disable the CPE-side loopback mode at the end of the timer to remove the closed traffic test loop across the communication link between the network terminal and the CPE.

4. The method of claim 1, wherein enabling the network terminal-side loopback mode comprises instructing Ethernet switches at the network terminal to operate in a loopback enabled state, the loopback enabled state of the Ethernet switches causing the network terminal to return the user data packets back to the CPE to establish the closed traffic test loop.

5. The method of claim 1, wherein injecting the number of data bits into the closed traffic test loop until the saturation threshold of the communication link is satisfied comprises:
   generating a number of testing packets required to saturate the communication link based on a length of the communication link between the network terminal and the CPE; and
   injecting the generated number of testing packets into the closed traffic test loop.

6. The method of claim 5, wherein the testing packets are different than the user data packets.

7. The method of claim 1, further comprising:
   determining, by the data processing hardware, whether the packet error-rate of the number of data bits circulating in the closed traffic test loop satisfies a lossy link threshold; and
   when the packet error-rate satisfies the lossy link threshold, determining, by the data processing hardware, the communication link between the network terminal and the CPE comprises a lossy link.

8. The method of claim 1, wherein removing the closed traffic test loop comprises:
   sending a test termination message from the data processing hardware to the CPE, the test termination message when received by the CPE, causing the CPE to disable the CPE-side loopback mode at the ONU; and
   disabling the network terminal-side loopback mode to remove the closed traffic test loop cross the communication link between the network terminal and the CPE.

9. The method of claim 8, wherein disabling the network terminal-side loopback mode comprises instructing Ethernet switches at the network terminal to operate in a loopback disabled state.

10. The method of claim 1, wherein the network terminal comprises an optical network terminal and the CPE comprises an optical network unit.

11. A system comprising:
    customer premises equipment (CPE); and
    a network terminal in communication with the CPE over a communication link, the network terminal comprising:
    data processing hardware; and
    memory hardware in communication with the data processing hardware, the memory hardware storing instructions that when executed on the data processing hardware cause the data processing hardware to perform operations comprising:
    receiving user data packets from the CPE, the received user data packets indicating that a CPE-side loopback mode is enabled;

in response to receiving the user data packets from the CPE, enabling a network terminal-side loopback mode to establish a closed traffic test loop across the communication link between the network terminal and the CPE;

injecting a number of data bits into the closed traffic test loop until a saturation threshold of the communication link is satisfied, the saturation threshold of the communication link is satisfied when the number of data bits circulating in the closed traffic test loop between the CPE and the network terminal in both uplink and downlink directions causes a traffic rate across the communication link to reach a line-rate;

when the number of data bits injected into the closed traffic test loop satisfies the saturation threshold, determining a packet error-rate of the number of data bits circulating in the closed traffic test loop; and after determining the packet error-rate, removing the closed traffic test loop across the communication link between the network terminal and the CPE.

12. The system of claim 1, wherein the operations further comprise, prior to receiving the user data packets from the CPE, sending a traffic test message to the CPE, the traffic test message requesting the CPE to enable the CPE-side loopback mode.

13. The system of claim 12, wherein the CPE is configured to initiate a timer in response to receiving the traffic test message, and disable the CPE-side loopback mode at the end of the timer to remove the closed traffic test loop across the communication link between the network terminal and the CPE.

14. The system of claim 1, wherein enabling the network terminal-side loopback mode comprises instructing Ethernet switches at the network terminal to operate in a loopback enabled state, the loopback enabled state of the Ethernet switches causing the network terminal to return the user data packets back to the CPE to establish the closed traffic test loop.

15. The system of claim 1, wherein injecting the number of data bits into the closed traffic test loop until the saturation threshold of the communication link is satisfied comprises:

generating a number of testing packets required to saturate the communication link based on a length of the communication link between the network terminal and the CPE; and injecting the generated number of testing packets into the closed traffic test loop.

16. The system of claim 15, wherein the testing packets are different than the user data packets.

17. The system of claim 1, wherein the operations further comprise:

Determining whether the packet error-rate of the number of data bits circulating in the closed traffic test loop satisfies a lossy link threshold; and when the packet error-rate satisfies the lossy link threshold, determining the communication link between the network terminal and the CPE comprises a lossy link.

18. The system of claim 1, wherein removing the closed traffic test loop comprises:

sending a test termination message from the data processing hardware to the CPE, the test termination message when received by the CPE, causing the CPE to disable the CPE-side loopback mode at the ONU; and disabling the network terminal-side loopback mode to remove the closed traffic test loop cross the communication link between the network terminal and the CPE.

19. The system of claim 18, wherein disabling the network terminal-side loopback mode comprises instructing Ethernet switches at the network terminal to operate in a loopback disabled state.

20. The system of claim 1, wherein the network terminal comprises an optical network terminal and the CPE comprises an optical network unit.

* * * * *